US008131732B2

(12) United States Patent
Yu et al.

(10) Patent No.: US 8,131,732 B2
(45) Date of Patent: Mar. 6, 2012

(54) RECOMMENDER SYSTEM WITH FAST MATRIX FACTORIZATION USING INFINITE DIMENSIONS

(75) Inventors: Kai Yu, Santa Clara, CA (US); Shenghuo Zhu, Santa Clara, CA (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 623 days.

(21) Appl. No.: 12/331,346

(22) Filed: Dec. 9, 2008

(65) Prior Publication Data

US 2009/0299996 A1 Dec. 3, 2009

Related U.S. Application Data

(60) Provisional application No. 61/058,385, filed on Jun. 3, 2008.

(51) Int. Cl.
*G06F 7/00* (2006.01)
*G06F 17/30* (2006.01)

(52) U.S. Cl. ..................................... 707/748

(58) Field of Classification Search ........... 707/999.107, 707/688, 694, 748

See application file for complete search history.

(56) References Cited

U.S. PATENT DOCUMENTS 6,496,816 B1 * 12/2002 Thiesson et al. ............. 706/52
2003/0051240 A1 * 3/2003 Schaffer et al. ............. 725/34

OTHER PUBLICATIONS

Ruslan Salakhutdinov and Andriy Mnih, Probabilistic Matrix Factorization, Jan. 2008, (NIPS'07), (http://www.cs.utoronto.ca/~rsalakhu/papers/nips07_pmf.pdf).*
Michael E. Tipping, Christopher M. Bishop, ProbabilisticPrincipal Component Analysis, Sep. 27, 1999, (http://www2.mta.ac.il/~gideon/courses/machine_learning_seminar/papers/ppca.pdf).*
S. Lazebnik, C. Schmid, and J. Ponce. Beyond bags of features: Spatial pyramid matching for recognizing natural scene categories, CVPR, 2006.
O. Boiman, E. Shechtman, and M. Irani. In defense of nearest-neighbor based image classification, CVPR, 2008.
A. Bosch, A. Zisserman, and X. Munoz. Image classification using random forests and ferns, ICCV, 2007.
J. Yang, J. Wright, T. Huang, and Y. Ma. Image superresolution as sparse representation of raw image patches. In CVPR, 2008.
H. Zhang, A. Berg, M. Maire, and J. Malik. Svm-knn: Discriminative nearest heighbor classification for visual category recognition, CVPR, 2006.
N. Srebro, J. Rennie, T. Jaakkola, Maximum-Margin Matrix Factorization, Advances in neural information processing systems, 2005.
J. Rennie, N. Srebro, Fast Maximum Margin Matrix Factorization for Collaborative Prediction, Proceedings of 22d Int'l Conf. On Machine Learning, Bonn, Germany 2005.

* cited by examiner

*Primary Examiner* — Mohammad Ali
*Assistant Examiner* — Alexey Shmatov
(74) *Attorney, Agent, or Firm* — Bao Tran; Joseph Kolodka

(57) ABSTRACT

A system is disclosed with a collaborative filtering engine to predict an active user's ratings/interests/preferences on a set of new products/items. The predictions are based on an analysis the database containing the historical data of many users' ratings/interests/preferences on a large set of products/items.

20 Claims, 4 Drawing Sheets

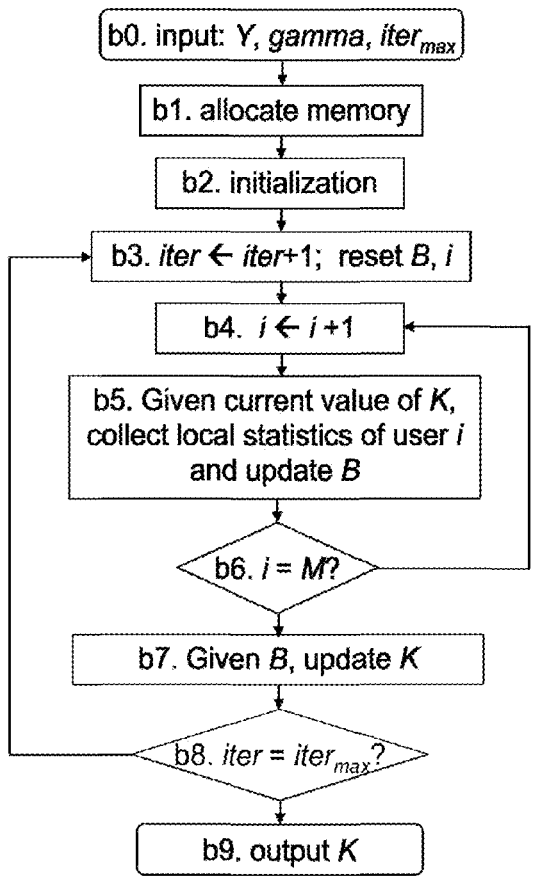

Flow chart of Algorithm 1, iSVD b0: states the required input b1: step 1 of Alg. 1, pre-allocate the memory for storing the symmetric n-by-n matrices K and B b2: step 2 of Alg. 1, initialize some parameters so that, iter is reset to be zero, K is an identity matrix, and R equals to N, the number of items b3: steps 4 and 5 of Alg. 1. iter indicates the current number of the iterations.

b4: step 7 of Alg. 1. i is the index of the user currently being processed.

b5: steps 8 and 9 of Alg. 1.

b6: step 10 of Alg. 1. It checks if all the M users have been processed. If not, process the next user by jumping to b4.

b7: steps 11-15 of Alg. 1.

b8: steps 16 of Alg. 1. It checks if the maximum number of iterations has been reached. If not, jump to b3 for another iteration.

b9: step 17 of Alg. 1. It terminates the computation and returns K as the result.

FIG. 2

RECOMMENDER SYSTEM WITH FAST MATRIX FACTORIZATION USING INFINITE DIMENSIONS

BACKGROUND

Recommender systems have become popular through sites such as amazon.com and netflix.com These systems analyze a database of many users' ratings on products, for example, movies, and make predictions about users' ratings/preferences on unseen/un-bought products. Many state-of-the-art recommender systems rely on "collaborative filtering" to discover user preferences and patterns. The technique interprets user data as a large matrix, one dimension, say, rows are indexed by users, and then columns are indexed by products. Elements of the matrix are the ratings of users on products. This matrix is usually large, due to large numbers of users and products, and highly sparse, because each user gave ratings on a small number of products. Then collaborative filtering analyzes the patterns of those observed ratings and makes predictions on those unobserved/missing ratings. To discover the rich structure of a huge sparse rating matrix, empirical studies showed that the number of factors should be sufficiently large. In this sense, collaborative filtering is a matrix completion problem.

Conventional techniques include low-rank matrix factorization methods where data is stored in a database as an M by N matrix, where M represents the users' ratings on N products. Since only a small portion of the matrix's ratings are observed, this matrix is quite large and sparse. The Low-rank Factorization technique factorizes the matrix into a product of two matrices, one represent user-specific factors, and the other product-specific factors. An optimization procedure is employed to find the factors that can best explain the data. The number of either user factors or product factors is finite. The prediction of a user's rating on a product is done by retrieving the factor vector of the user and the factor vector of the product, and then calculating their inner product to give the result. With the sheer growth of online user data, it becomes a big challenge to develop learning algorithms that are accurate and scalable.

Recent advances in collaborative filtering has fueled the growth of low-rank matrix factorization methods. Low-rank matrix factorization algorithms for collaborative filtering can be roughly grouped into non-probabilistic and probabilistic approaches. In a recent Netflix competition, the matrix factorization technique is highly popular among the top participants. When matrix factorization is applied by multiplication of a number of user factors and movie factors, both sides of the factors are found by matrix factorization. For computational efficiency, all the techniques assume the number of factors is small. Therefore the matrix factorization is low-rank factorization. However, limiting the rank of the system often scarifies the predictive accuracy, as the large variety of user patterns needs a large number of factors to explain.

SUMMARY

Systems and methods are disclosed for generating a recommendation by performing collaborative filtering using an infinite dimensional matrix factorization; generating one or more recommendations using the collaborative filtering; and displaying the recommendations to a user.

Advantages of the preferred embodiment may include one or more of the following. The recommender system uses a collaborative filtering technique with very large or even infinite number of factors. The instant filtering techniques provides scalability and efficiency to efficiently handle large amounts of data while maintaining high accuracy to make accurate predictions on user ratings/preferences. Due to the increased capacity, the system can more accurately predict user ratings/preferences. The computation is efficiently done such that the system can be scaled to very large-scale user rating databases. The system can improve the performance of many on-line services, including on-line store, news websites, online advertisement, which needs to have a better understanding about user preferences. The system can be used to analyze a wide range of user expressed preferences in an explicit way (e.g., numerical ratings), or in an implicit way (e.g., clickthroughs), more efficiently and more accurately, so that the user satisfaction and business revenue can be both improved.

BRIEF DESCRIPTION OF THE DRAWINGS

FIG. 2 shows an exemplary process to perform iSVD (infinite-dimensional Singular Value Decomposition).

DESCRIPTION

Figure 1:
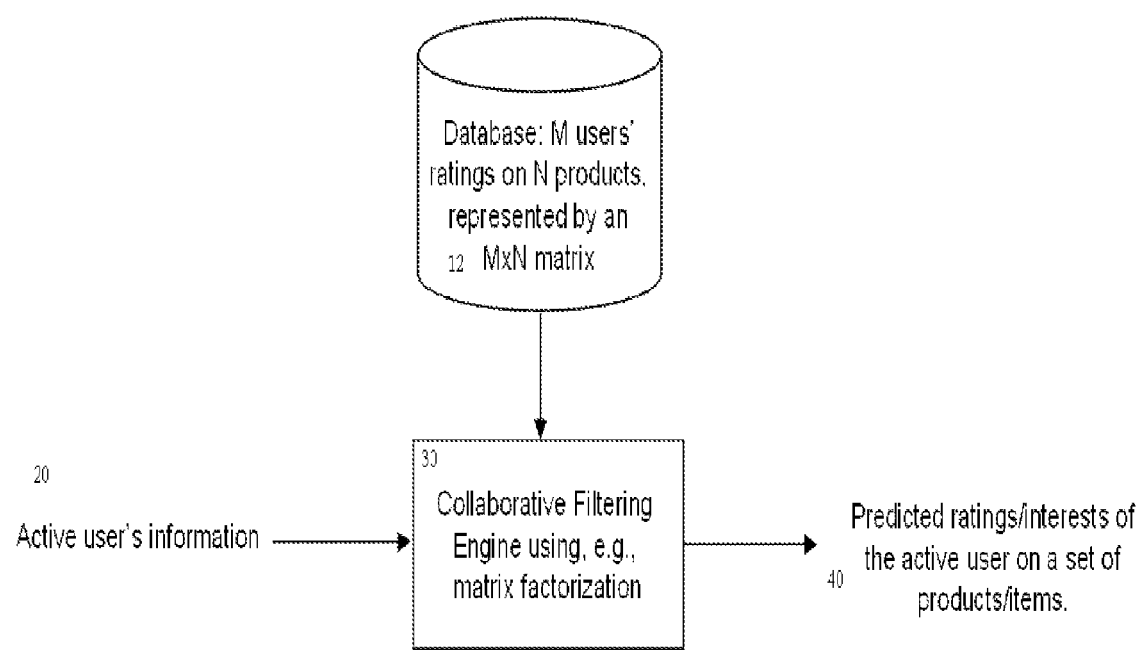
FIG. 1 shows an exemplary recognition system employing a collaborative filtering engine to predict user preferences, among others.

FIG. 1 depicts an exemplary recognition system employing a collaborative filtering engine to predict an active user's ratings/interests/preferences on a set of new products/items. The predictions are based on an analysis the database containing the historical data of many users' ratings/interests/preferences on a large set of products/items.

The system of FIG. 1 retrieves data from a database 12. The database contains M user's ratings on N products, thus the information is in an M×N matrix. The information is provided to an engine 30 for generating a recommendation. The engine 30 performs collaborative filtering using an infinite dimensional matrix factorization. The engine 30 collect information 20 from currently active users, and generates one or more recommendations or predictions 40 using the collaborative filtering.

The system uses infinite-dimensional matrix factorization methods such as Singular Value Decomposition (SVD) and probabilistic Principal Component Analysis (pPCA).

The dimensionality of two low-rank matrix factorization methods, singular value decomposition and probabilistic principal component analysis, are allowed to approach infinity. Learning with infinite dimensions surprisingly obtains excellent accuracy in predicting user ratings.

In the limit of infinite dimensions, both converge to simple and similar formulations called iSVD and iPCA, respectively. By exploiting the data sparsity and carefully reorganizing the computation, such infinite-dimensional models is efficient for handling large-scale sparse matrices. In tests, iPCA performs as fast as its non-probabilistic counterpart iSVD.

Low-Rank Matrix Factorization

In the discussion below on Matrix, Vector, and Gaussian Distribution, uppercase letters are used to denote matrices and lowercase letters to denote vectors, which are by default column vectors. For example, $Y \in R^{M \times N}$ is an matrix, its (i,j)-th element is $Y_{i,j}$, and its i-th row is represented by an N×1 vector $y_i$. The transpose, trace, and determinant of Y is denoted by $Y^T$, tr(Y), and det(Y), respectively. I denotes identity matrix with an appropriate dimensionality. Moreover, $\|y\|$ is the vector $l_2$-norm, $\|y\|_F$ denotes the Frobenius norm, and $\|y\|_*$ the trace norm, which equals to the sum of the singular values of Y. A multi-variate Gaussian distribution of a vector y with mean $\mu$ and covariance matrix $\Sigma$ can be denoted by $N(y;\mu,\Sigma)$, or by $y:N(\mu,\Sigma)$ $E(\cdot)$ means the expectation of random variables such that $E(y)=\mu$ and $E[(y-\mu)(y-\mu)^T]=Cov(y)=\Sigma$.

For a Sparse Matrix, if Y contains missing values, O denotes the indices of observed elements of Y, and $|O|$ the number of observed elements. $(i,j)\epsilon O$ if $Y_{i,j}$ is observed, $(Y)_O^2 = \Sigma_{(i,j)\epsilon O} Y_{i,j}^2$ is the sum of the square of all observed of Y. $O_i$ denotes the indices of non-missing elements of the i-th row $y_i$. For example, if $y_i$'s elements are all missing except the 1st and the 3rd elements, then: (i) $O_i=[1,3]^T$ and $y_{O_i}=[Y_{i,1}, Y_{i,3}]^T$. (ii) If K is a square matrix, $K_{:,O_i}$ denotes a sub matrix formed by the 1st column and 3rd column of K. (iii) $K_{O_i}$ is a sub square matrix formed by the intersections between the 1st & 3rd rows and the 1st & 3rd columns of K.

In Matrix Factorization and Collaborative Filtering, for an M×N rating matrix Y describing M users' numerical ratings on N items, a low-rank matrix factorization approach seeks to approximate Y by an multiplication of low-rank factors, namely $$Y \approx UV^T \quad (1)$$

where U is an M×L matrix and V an N×L matrix, L<min(M, N). Without loss of generality, M>N is assumed. Since each user rated only a small portion of the items, Y is usually extremely sparse. Collaborative filtering can be seen as a matrix completion problem, where the low-rank factors learned from observed elements are used to fill in unobserved elements of the same matrix.

In Singular Value Decomposition, SVD can be derived from the results of approximating a fully observed matrix Y by minimizing $\|Y-UV^T\|_F$. However when Y contains a large number of missing values, a modified SVD seeks to approximate those known elements of Y $$\min_{U \in R^{M \times L}, V \in R^{N \times L}} (Y - UV^T)_O^2 + \gamma_1 \|U\|_F^2 + \gamma_2 \|V\|_F^2 \quad (2)$$

where $\gamma_1, \gamma_2 > 0$, the two regularization terms $\|U\|_F^2$ and $\|V\|_F^2$ are added to avoid overfitting. The optimization problem is non-convex. Gradient based approaches can be applied to find a local minimum and are among the most popular methods applied to collaborative filtering.

In Probabilistic Principle Component Analysis, pPCA assumes that each element of Y is an noisy outcome of a linear transformation $$Y_{i,j} = u_i^T v_j + e_{i,j}, (i,j) \epsilon O \quad (3)$$

where $U=[u_i] \epsilon R^{M \times L}$ are the latent variables following a prior distribution $u_i: N(0,I)$, $i=1, \ldots, M$, and $e_{i,j}: N(0,\sigma^2)$ is an independent Gaussian noise. The learning can be done by maximizing the marginalized likelihood of observations using an Expectation-Maximization (EM) algorithm, which iteratively computes the sufficient statistics of $p(u_i|V,\sigma^2)$, $i=1, \ldots, M$ at the E-step and then update V and $\sigma^2$ at the M-step. The original formulation includes a mean of $y_i$, as that data is pre-centralized for simplicity. Related probabilistic matrix factorizations have been applied in collaborative filtering.

Matrix Factorization with "Infinite Dimensions"
SVD in the Limit $L \to \infty$
In the limit of "infinite dimensions", i.e., $L \to \infty$, the low-rank matrix factorization problem (2) converges to a convex optimization problem. At $L \to \infty$, if U and V are both full-rank, the problem (2) is equivalent to $$\min_{X, K > 0} (Y - X)_O^2 + \gamma_1 tr(XK^{-1}X^T) + \gamma_2 tr(K) \quad (4)$$

Plugging the optimum condition $$K = \sqrt{\gamma_1/\gamma_2} \, tr\left[(XX^T)^{\frac{1}{2}}\right]$$

into (4), the equivalence to a convex learning problem which imposes trace norm regularization is obtained as:

$$\min_{X \in R^{M \times N}} (Y - X)_O^2 + 2\sqrt{\gamma_1 \gamma_2} \, PXP_* \quad (5)$$

This equivalence suggests that the problem (4) is convex. Therefore, its global optimum can be reached by any algorithm that pursuits a local optimum.

Despite of the equivalence, (5) resorts to semidefinite programming that can handle only small matrices, while (4) is much easier to solve and more scalable. (5) implies that it is unnecessary to distinguish $\gamma_1$ and $\gamma_2$, therefore $\gamma = \gamma_1 = \gamma_2$. An EM-like algorithm can be used by alternatively updating X and K. A nice property is that the both updates have analytical solutions:

E-step—Update X: Given the current K, update each row of X independently by solving a standard kernel regression problem $\min_{x_i}[(y_i - x_i)_O^2 + \gamma x_i^T K^{-1} x_i]$, which leads to $$x_i \leftarrow K_{:,O_i}(K_{O_i} + \gamma I)^{-1} y_{O_i}, i=1, \ldots, M, \quad (6)$$

where $K_{:,O_i} \epsilon R^{N \times |O_i|}$ and $K_{O_i} \epsilon R^{|O_i| \times |O_i|}$. $|O_i|$ is usually a small number since each user does not rate many items.

M-step—Update K: Given the current X, $$K \leftarrow \sqrt{X^T X} = Q\sqrt{S}Q^T \quad (7)$$

where Q and S are the results of the standard eigenvalue decomposition $X^T X = QSQ^T$, and $\sqrt{S}$ is a diagonal matrix formed by the square roots of eigenvalues.

Implementation of the algorithm requires basic matrix computations. The kernel regression problem (6) suggests that, though working with possibly "infinite dimensions", the so-called "kernel trick" can be applied to exploit the huge sparsity of data. However, there is still a big room to achieve a higher efficiency, which will be discussed below.

pPCA in the Limit $L \to \infty$

For the pPCA model (3) in the limit of infinite dimensions, it is infeasible to directly handle either $u_i$ or $v_j$ so $x = [X_{i,1}, \ldots, X_{i,N}]^T$, where $X_{i,j} = u_i^T v_j$. It is easy to see that $x_i$ following an N-dimensional Gaussian distribution with the mean $E(x_i) = VE(u_i) = 0$, and covariance $E(x_i x_i^T) = VE(u_i u_i^T)V^T = VV^T$. Let $K = VV^T$, and relax the rank constraint such that K is a positive-definite kernel matrix, pPCA (3) is generalized to a simple generative model $$y_i = x_i + e_i, i=1, \ldots, M \quad (8)$$

where $e_i = [e_{i,1}, \ldots, e_{i,N}]$ and $x_i: N(0,K)$ and $e_i: N(0,\sigma^2 I)$. The model describes a latent process X, and an observational process Y, whose marginal probability is $$p(Y \mid K, \sigma^2) = \int p(Y, X \mid K, \sigma^2) dX \qquad (9)$$

$$= \prod_{i=1}^{M} N(y_{O_i}; 0, K_{O_i} + \sigma^2 I).$$

pPCA assumes that each row of Y is an i.i.d. sample drawn from a Gaussian distribution with covariance $K+\sigma^2 I$. To maximize the joint likelihood $p(Y,X|K,\sigma^2)$ with respect to X and K, a solution is obtained for the following optimization problem $$\min_{X, K>0} (Y - X)_O^2 + \sigma^2 (X K^{-1} X^T) + M\sigma^2 \mathrm{logdet}(K) \qquad (10)$$

Comparing the above problem with the SVD problem (4), the two formulations are very similar. One major difference is that (10) applies the log-determinant as a low-complexity penalty, instead of using the trace norm.

However (10) is not a probabilistic way to deal with uncertainties and missing data. A principled approach requires to integrate out all the missing/latent variables, and aims to maximize the marginalized likelihood (9). This is done by a canonical expectation-maximization (EM) algorithm:

E-step: Compute the sufficient statistics of $p(x_i|y_{O_i},K,\sigma^2)$, i=1, ..., M, $$E(x_i) = K_{:,O_i}(K_{O_i} + \sigma^2 I)^{-1} y_{O_i} \qquad (11)$$

$$\mathrm{Cov}(x_i) = K - K_{:,O_i}(K_{O_i} + \sigma^2 I)^{-1} K_{O_i,:} \qquad (12)$$

M-step: Based on the results of the last E-step, update the parameters $$K \leftarrow \frac{1}{M} \sum_{i=1}^{M} [\mathrm{Cov}(x_i) + E(x_i) E(x_i)^T] \qquad (13)$$

$$\sigma^2 \leftarrow \frac{1}{|O|} \sum_{(i,j) \in O} \{C_{i,j} + [Y_{i,j} - E(X_{i,j})]^2\} \qquad (14)$$

where $C_{i,j}$ is the j-th diagonal element of $\mathrm{Cov}(x_i)$, i.e., the posterior variance of $X_{i,j}$.

The EM algorithm appears to be similar to the one presented in Section 3.1, because both involve a kernel regression procedure, (6) and (11), at the E-step. Since the optimization is non-convex, the above algorithm finds a local optimum.

Large-Scale Implementation

For notational conveniences, the two algorithms are called iSVD (infinite-dimensional SVD) and pPCA (infinite-dimensional pPCA). Large-scale implementations of the two algorithms are discussed next. The two EM algorithms share a few common computational aspects: (1) Instead of estimating the latent factors U and V, they work on an approximating matrix X; (2) The major computational burden is the E-step; (3) In both cases, the E-step is decomposed into independent updates of $x_i$, i=1, ..., M; (4) For each update of $x_i$, kernel trick is applied to exploit the sparsity of Y. Though the last two properties bring some hope, a naive implementation is still too expensive on large-scale data. For example, on the Netflix problem, only one E-step will consume over 40 hours by iSVD on a PC with a 3.0 GHz CPU and 3.0 G memory. Even worse, since pPCA takes into account the distribution of X and computes its second order statistics by (12), it costs additional 4000 hours in a single E-step. In the following, the computation cost of (6) or (11) can be significantly reduced, and the overhead caused by (12) is almost completely avoidable. As the result, iSVD is as fast as low-rank matrix factorization methods, while pPCA is as fast as its non-probabilistic counterpart—iSVD.

iSVD

The computational cost of (6), which is the bottleneck of iSVD, is reduced by rewriting the computation as $$x_i = K z_i,$$

where K is the N×N full kernel matrix, and $z_i \in R^N$ is a vector of zeros, excepts those elements at positions $O_i$, whose values are assigned by $$z_{O_i} = (K_{O_i} + \gamma I)^{-1} y_{O_i}.$$

The re-formulation of (6) suggests that (7) can be realized without explicitly computing X, since $$X^T X = K \left( \sum_{i=1}^{M} z_i z_i^T \right) K \Rightarrow K \leftarrow \sqrt{K \left( \sum_{i=1}^{M} z_i z_i^T \right) K}. \qquad (15)$$

The above analysis suggests that, for every row i, the system can avoid the multiplication of an N×|$O_i$| matrix K: with a vector $z_{O_i}$ of length |$O_i$|, and the $N^2$ multiplication $x_i x_i^T$ (i.e., replaced by the smaller $|O_i|^2$ multiplication $z_{O_i} z_{O_i}^T$). In total the system gets a reduction of $$N \sum_{i=1}^{M} |O_i|^2 + N^2 M$$

multiplication operations. On the Netflix data, this means a reduction of over 40 hours for one E-step, and the resulting computation takes less than 4 hours.

The next computation is the eigenvalue decomposition required by (7). Since the trace norm regularizer is a rank minimization heuristic, after some steps if K is rank R, based on (15) the next K has a rank no more than R. Thus at each iteration the system checks the rank R of K and at the next iteration compute only the leading R eigenvalues of K.

The pseudo code is described by Algorithm 1. To keep the description compact, minor details have been omitted including that (1) if the predictions deteriorate on a small set of validation elements and quit the program if that happens; (2) Q and S are used to compute step 1 via $KBK=QS(QBQ)SQ^T$, and the resulting matrix is stored in the memory used for K. The largest memory consumption happens during the inner loop, where the system stores two N×N matrices B and K, with totally N(N−1) memory cost. The major computation is also the inner loop, which is where $$O\left( \sum_{i=1}^{M} |O_i|^3 \right)$$

when $|O_i|=N$. After obtaining K, the prediction on a missing element at (i,j) is by $X_{i,j} = K_{j,O_i}(K_{O_i} + \sigma^2 I)^{-1} y_{O_i}.$

Algorithm 1
iSVD

```
Require: Y, γ > 0, iter_max;
 1:   allocate K ∈ ℝ^{N×N}, B ∈ ℝ^{N×N};
 2:   initialize iter = 0, K = I, R = N;
 3:   repeat
 4:       iter ← iter + 1;
 5:       reset B, i;
 6:       repeat
 7:           i ← i + 1;
 8:           t = (K_{O_i} + γI)^{-1} y_{O_i};
 9:           B_{O_i} ← B_{O_i} + tt^T;
10:       until i = M;
11:       [Q, S] = EigenDecomposition(KBK, rank = R);
12:       S ← Sqrt(S);
13:       R ← min K, subject to ∑_{m=1}^{K} S_m ≥ ∑_{m=1}^{R} S_m;
14:       S ← Truncate(S, R);
15:       K ← QSQ^T;
16:   until iter = iter_max
17:   return K;
```

For the above process:
1. Y: a sparse M-by-N rating matrix, M users, N items
2. Gamma γ: regularization parameter
3. $iter_{max}$: the maximum number of iterations of the algorithm
4. K: N-by-N kernel matrix, the parameter this algorithm optimizes and outputs in the end.
5. B: N-by-N matrix, it is used to store some intermediate result at step 9
6. t: N-by-1 vector, it is used to store some intermediate result at step 8
7. R: the rank of eigen-value matrix factorization at step 11
8. iter: the number of the current iteration
9. i: the index of the user currently being processed by the algorithm
10. Q, S: the results of the eigen-value decomposition QSQ' of the matrix KBK, where Q' is the transpose of Q, Q is an N-by-R matrix, S is an N-by-N diagonal matrix FIG. 2 shows an exemplary iSVD process. In b0, the process receives the required input. Next, in b1, the process pre-allocates the memory for storing the symmetric n-by-n matrices K and B. In b2, the process initializes parameters so that, iter is reset to be zero, K is an identity matrix, and R equals to N, the number of items. Next, in b3-b8, the process loops with counter iter indicating the current number of the iterations. In b4, i is the index of the user currently being processed. In b5, the process collects local statistics of user I and update B given current value of K. In b6, the process checks if all the M users have been processed. If not, process the next user by jumping to b4. b7 implements steps 11-15 of Alg. 1 to update K. In b8, the process checks if the maximum number of iterations has been reached. If not, jump to b3 for another iteration. In b9, when done, the process terminates the computation and returns K as the result.

iPCA

Compared to the non-probabilistic iSVD, the E-step of iPCA has one additional step (12) to compute an N×N posterior covariance matrix for every i=1 . . . , M. However, the overhead is almost avoidable. Let B be an N×N matrix whose elements are initialized as zeros, then used to collect the local information by $$B_{O_i} \leftarrow B_{O_i} - G_i + z_{O_i} z_{O_i}^T, \text{for } i=1,\ldots,M \quad (16)$$

where $G_i = (K_{O_i} + \sigma^2 I)^{-1}$ and $z_{O_i} = G_i \cdot y_{O_i}$. Given above, the M-step (13) can be realized by $$K \leftarrow K + \frac{1}{M} KBK. \quad (17)$$

Therefore there is no need to explicitly perform (12) to compute an N×N posterior covariance matrix for every i, which saves $$N \sum_{i=1}^{M} |O_i|^2 + N^2 \sum_{i=1}^{M} |O_i|$$

multiplications. On the Netflix problem, this reduces over 4,000 hours for one E-step. The pseudo code is given in Algorithm 2.

Algorithm 2
iPCA

```
Require: Y, iter_max;
 1:   allocate K ∈ ℝ^{N×N}, B ∈ ℝ^{N×N};
 2:   initialize iter = 0, K = I;
 3:   repeat
 4:       iter ← iter + 1;
 5:       reset B, Er = 0, i = 0;
 6:       repeat
 7:           i ← i + 1;
 8:           G = (K_{O_i} + σ^2 I)^{-1};
 9:           t = G · y_{O_i};
10:           Er ← Er + Σ_{j∈O_i}(Y_{i,j} - K_{j,O_i} t)^2;
11:           Er ← Er + Σ_{j∈O_i}(K_{j,j} - K_{j,O_i} A K_{O_i,j});
12:           B_{O_i} ← B_{O_i} - G + tt^T;
13:       until i = M;
14:       K ← K + (1/M) KBK;
15:       σ^2 ← (1/|O|) Er;
16:   until iter = iter_max
17:   return K, σ^2;
```

Algorithm 3
Fast iPCA

```
Require: Y, iter_max;
 1:   allocate K ∈ ℝ^{N×N}, B ∈ ℝ^{N×N}, b ∈ ℝ^N, μ ∈ ℝ^N;
 2:   initialize iter = 0, K = I;
 3:   repeat
 4:       iter ← iter + 1;
 5:       reset B, b, i = 0;
 6:       repeat
 7:           i ← i + 1;
 8:           G = K_{O_i}^{-1};
 9:           t = G(y_{O_i} - μ_{O_i});
10:           b_{O_i} ← b_{O_i} + t;
11:           B_{O_i} ← B_{O_i} - G + tt^T;
12:       until i = M;
13:       K ← K + (1/M) KBK;
```

-continued

Algorithm 3
Fast iPCA

14:  $\mu \leftarrow \mu + \frac{1}{M}b;$

Figure 3:
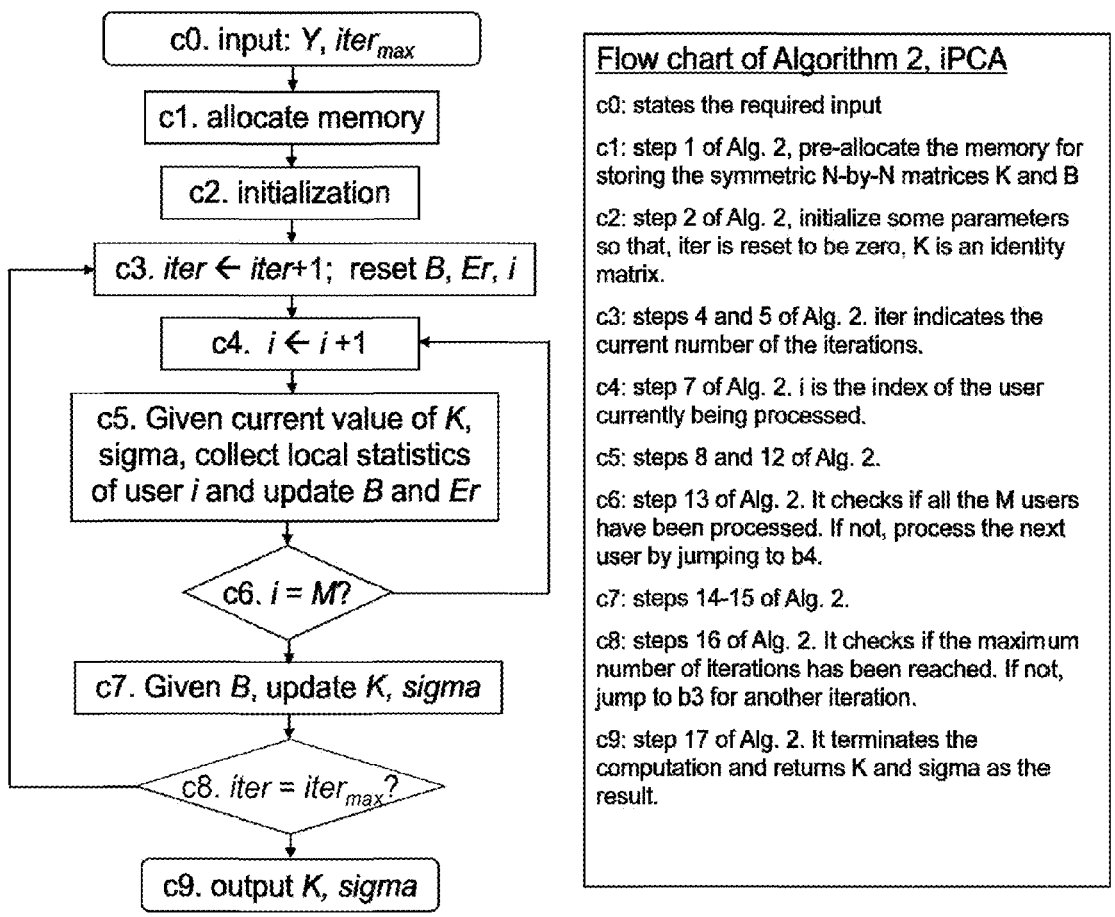
FIG. 3 shows an exemplary process to perform pPCA (infinite-dimensional probabilistic Principal Component Analysis).

15:  until iter = iter$_{max}$
16:  return K, μ;

In discussing FIG. 3, the following notations are used:
1. Y: a sparse M-by-N rating matrix, M users, N items
2. iter$_{max}$: the maximum number of iterations of the algorithm
3. K: N-by-N kernel matrix, a parameter this algorithm optimizes and outputs in the end.
4. B: N-by-N matrix, it is used to store some intermediate result at step 13
5. G: a matrix, it is used to store the intermediate result at step 9
6. t: a vector, it is used to store the intermediate result at step 10
7. Er: a scalar, it is used to store the intermediate result at steps 11 and 12
8. iter: the number of the current iteration
9. i: the index of the user currently being processed by the algorithm
10. sigma (σ): the standard deviation of noise, $σ^2$ is the variance of noise.

FIG. 3 shows an exemplary iPCA process. In this process, c0 receives the required input. In c1, the process pre-allocates the memory for storing the symmetric N-by-N matrices K and B. Next, in c2, the process initializes some parameters so that, iter is reset to be zero, K is an identity matrix. In c3, the current number of the iterations is incremented, and B, Er, and i are reset. In c4, the index i of the user currently being processed is incremented. In c5, the local statistics of each user are collected and B and Er are updated. In c6, the process checks if all M users have been processed. If not, process the next user by jumping to c4. In c7, K and sigma are updated. Next, in c8 the process checks if the maximum number of iterations has been reached. If not, jump to c3 for another iteration. The process concludes in c9 where it terminates the computation and returns K and sigma as the result.

Figure 4:
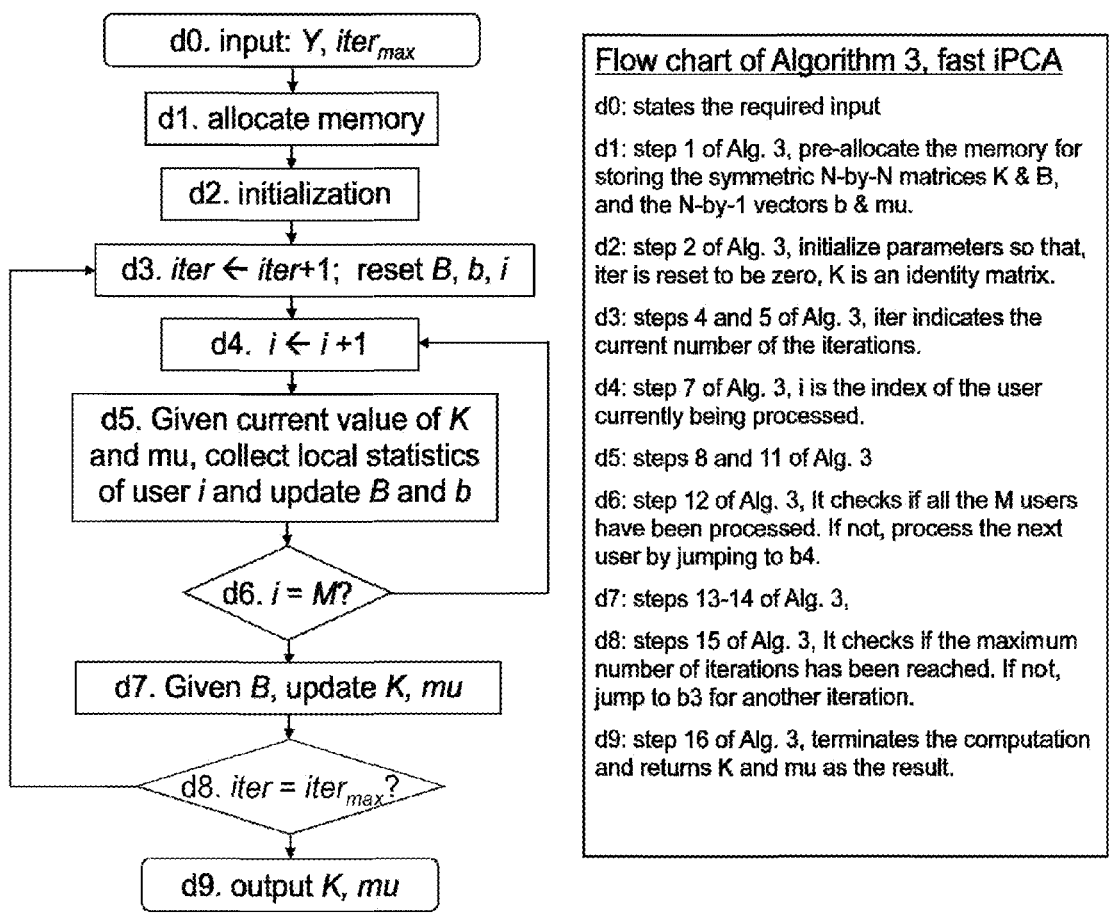
FIG. 4 shows an exemplary process to perform fast pPCA.

FIG. 4 shows an exemplary fast iPCA process. The following notations apply to the process of FIG. 4.
1. Y: a sparse M-by-N rating matrix, M users, N items
2. iter$_{max}$: the maximum number of iterations of the algorithm
3. K: N-by-N kernel matrix, a parameter the algorithm optimizes and outputs in the end.
4. B: N-by-N matrix, it is used to store some intermediate result at step 11
5. b: N-by-1 vector, it is used to store the intermediate result at step 10
6. mu: N-by-1 vector, the other parameter this algorithm optimizes and outputs in the end.
7. G: a matrix, it is used to store the intermediate result at step 8
8. t: a vector, it is used to store the intermediate result at step 9
9. iter: the number of the current iteration
10. i: the index of the user currently being processed by the algorithm Referring now to FIG. 4, in d0, the process receives the required input. In d1, the process pre-allocates memory for storing the symmetric N-by-N matrices K & B, and the N-by-1 vectors b & mu. In d2, the process initializes parameters so that, iter is reset to be zero, K is an identity matrix. In d3, the current number of the iterations is incremented and in d4, the next user is selected. In d5, local statistics on the current user are collected and B and b are updated. In d6, the process checks if all the M users have been processed. If not, process the next user by jumping to d4. In d7, the process updates K and mu in accordance with steps 13-14 of Alg. 3. In d8 the process checks if the maximum number of iterations has been reached. If not, the process jumps to d3 for another iteration. In d9, the process terminates the computation and returns K and mu as the result.

Comparing Algorithm 2 with Algorithm 1, the remaining computation overhead of the probabilistic approach lies in the steps that collect local uncertainty information for preparing to update the noise variance $σ^2$, which costs additional $$\sum_{i=1}^{M}(2|O_i|^2+|O_i|^3)$$

multiplications for each E-step. In order to further speed-up the algorithm, iPCA can be simplified. The essential modeling assumption of (8) is that Y is a collection of rows $y_i$ independently and identically following a Gaussian distribution $N(0,K+σ^2I)$. Then the idea is, rather than modeling the noise and signal explicitly, the process merges by $K \leftarrow K+σ^2I$ and directly deal with the covariance of the noisy observations $y_i$, i=1, ..., M. The obtained model is simply:

$$Y_{i,j}: δ(X_{i,j}), \text{where } x_i:N(\mu,K), \quad (18)$$

and $δ(X_{i,j})$ is the distribution with a probability one if $Y_{i,j}=X_{i,j}$ and zero otherwise. For this model the EM algorithm is the following:
E-step: $E(x_i)=K_{:,O_i}(K_{O_i})^{-1}(y_{O_i}-\mu_{O_i})$ and $Cov(x_i)=K-K_{:,O_i}(K_{O_i})^{-1}K_{O_i,:}$.
M-step:

$$K \leftarrow \frac{1}{M}\sum_{i=1}^{M}[Cov(x_i)+E(x_i)E(x_i)^T]$$

and $$\mu \leftarrow \mu + \frac{1}{M}\sum_{i=1}^{M}E(x_i).$$

The implementation is summarized by Algorithm 2. Since there is no need to estimate the noise, the computational cost at the E-step has only minor differences from that of the non-probabilistic Algorithm 1. Compared with Algorithm 2, in one E-step, the new version saves about 11.7 hours on the Netflix data, and ends up with only 4 hours. The memory cost is also the same as Algorithm 1, which is N(N−1) for storing K and B. The prediction is made by computing the expectation $E(Y_{i,j})=K_{j,O_i}(K_{O_i})^{-1}(y_{O_i}-\mu_{O_i})+\mu_j$. Due to its remarkable simplicity, the faster version of iPCA was used in the experiments.

Next, the efficiency and accuracy of the described Algorithms 1 and 2 were tested against the two largest publicly available benchmarks, the EachMovie data and Netflix data.

The two algorithms were tested on the EachMovie data of size 74424×1648 and the Netflix data of size 480189×17770, the two largest public benchmarks to date, and achieved results that are, in term of both efficiency and accuracy, comparable or even superior to state-of-the-art performances achieved by low-rank matrix factorization methods.

EachMovie Data

A series of experiments on the whole EachMovie data, which includes 74424 users' 2811718 distinct numeric ratings on 1648 movies. This is a very sparse matrix because in average 97.17% of the elements are missing. Randomly, about 80% of each user's ratings were selected for training and the remaining 20% as test cases. The random selection was done 20 times independently. The following algorithms are tested: (1) SVDs: Low-rank SVDs with 20 and 40 dimensions, plus the iSVD described above. The two low-rank methods are optimized by conjugate gradient methods. The stopping criterion is based on the performance on a small hold-out set of the training elements. For each algorithm, the regularization parameter was set from $\gamma=1, 5, 10, 20, 50$, and 100 based on the performance on the hold-out set when testing the first partition. (2) PCAs: Low-rank pPCAs with 20 and 40 dimensions, plus the iPCA described above. For these three methods the stopping criterion was also based on the hold-out set, plus that the total number of EM iterations should not exceed 30. A nice advantage about these pPCA models is that, there is no regularization parameter to tune!

Instead of presenting the averaged results, the individual RMSE results of all the 20 trials are listed in the table below. For all the methods, variations over random train/test partitions are small. For each of the two categories, SVD and pPCA, the infinite models consistently outperformed their each own low-rank counterparts. This means, there are indeed advantages of relaxing the dimensionality constraints of models. Second, the probabilistic approaches consistently outperformed those SVD methods. In particular, iPCA is the winner over all the 20 trials. The average RMSE error of iPCA is 4.33% lower than that of iSVD, 6.90% lower than that of SVD (d=20). The results clearly advocate the advantage of probabilistic models in terms of predictive accuracy.

The algorithms were implemented using C++. The run time averaged over 20 trials are reported in Table 2. The SVD using conjugate gradients converged very slowly. As analyzed before, iSVD and iPCA have essentially the same computational cost. Here iPCA took longer time, because iSVD stopped usually after 5 iterations due to the detected overfitting, while overfitting was not observed for pPCA methods which finished all 30 iterations.

TABLE 1

RMSEs of finite and infinite SVD models for collaborative filtering on the EachMovie data

| | Partition | | | | | | | | | |
|---|---|---|---|---|---|---|---|---|---|---|
| | 1 | 2 | 3 | 4 | 5 | 6 | 7 | 8 | 9 | 10 |
| SVD (20) | 1.1651 | 1.1620 | 1.1638 | 1.1677 | 1.1655 | 1.1625 | 1.1640 | 1.1601 | 1.1618 | 1.1687 |
| SVD (40) | 1.1569 | 1.1532 | 1.1559 | 1.1598 | 1.1569 | 1.1551 | 1.1566 | 1.1521 | 1.1540 | 1.1608 |
| iSVD | 1.1329 | 1.1314 | 1.1316 | 1.1311 | 1.1332 | 1.1337 | 1.1331 | 1.1314 | 1.1342 | 1.1327 |
| | Partition | | | | | | | | | |
| | 11 | 12 | 13 | 14 | 15 | 16 | 17 | 18 | 19 | 20 |
| SVD (20) | 1.1616 | 1.1638 | 1.1611 | 1.1664 | 1.1601 | 1.1693 | 1.1615 | 1.1627 | 1.1606 | 1.1643 |
| SVD (40) | 1.1535 | 1.1562 | 1.1528 | 1.1595 | 1.1520 | 1.1514 | 1.1540 | 1.1547 | 1.1526 | 1.1561 |
| iSVD | 1.1326 | 1.1345 | 1.1318 | 1.1311 | 1.1304 | 1.1325 | 1.1311 | 1.1321 | 1.1321 | 1.1329 |

TABLE 2

RMSEs of finite and infinite pPCA models for collaborative filtering on the EachMovie data

| | Partition | | | | | | | | | |
|---|---|---|---|---|---|---|---|---|---|---|
| | 1 | 2 | 3 | 4 | 5 | 6 | 7 | 8 | 9 | 10 |
| pPCA (20) | 1.1045 | 1.1034 | 1.1031 | 1.1028 | 1.1045 | 1.1063 | 1.1057 | 1.1041 | 1.1040 | 1.1063 |
| pPCA (40) | 1.1011 | 1.1004 | 1.1006 | 1.0998 | 1.1011 | 1.1035 | 1.1008 | 1.1011 | 1.1030 | 1.1004 |
| iPCA | 1.0831 | 1.0825 | 1.0822 | 1.0820 | 1.0834 | 1.0844 | 1.0836 | 1.0824 | 1.0845 | 1.0828 |
| | Partition | | | | | | | | | |
| | 11 | 12 | 13 | 14 | 15 | 16 | 17 | 18 | 19 | 20 |
| pPCA (20) | 1.1036 | 1.1058 | 1.1055 | 1.1047 | 1.1050 | 1.1035 | 1.1031 | 1.1045 | 1.1037 | 1.1036 |
| pPCA (40) | 1.1014 | 1.1012 | 1.1026 | 1.1012 | 1.1025 | 1.0990 | 1.0994 | 1.1024 | 1.1030 | 1.1014 |
| iPCA | 1.0834 | 1.0819 | 1.0837 | 1.0845 | 1.0825 | 1.0839 | 1.0842 | 1.0817 | 1.0818 | 1.0836 |

Netflix Data

The Netflix data were collected representing the distribution of ratings Netflix.com obtained during a period of 1998-2005. The released training data consists of 100,480,507 ratings from 480,189 users on 17,770 movies. In addition, Netflix also provides a set of validation data with 1,408,395 ratings. Therefore there are 98.81% of elements are missing in the rating matrix. In order to evaluate the prediction accuracy, there is a test set containing 2,817,131 ratings whose values are withheld and unknown for all the participants. In order to assess the RMSE on the test set, participants need to submit their results to Netflix, who then sends back an email informing the RMSE error. Since results are evaluated on exactly the same test data, it offers an excellent platform to compare different algorithms.

The Algorithms 1 and 2 were tested on the training data plus a random set of 95% of the validation data, the remaining 5% of the validation data were used for the stopping criterion. In the following Table 3 shows the results obtained by the two models, with state-of-the-art results reported in the literature by matrix-factorization methods. People have reported superior results by combining heterogenous models of different nature while the results achieved by the present system uses a single model. In the table, the Baseline result was made by Netflix's own algorithm. BPMF is Bayesian probabilistic matrix factorization using MCMC, which produced so far the state-of-the-art accuracy by low-rank methods. iPCA achieved an even better result than BPMF, improved the accuracy by 6.18% from the baseline. iSVD did not perform very well on this data set, perhaps due to a need to fine-tune the regularization parameter. However this contrasts the advantage of iPCA that has no parameter to tune. In terms of run-time efficiency, both algorithms used about 5 hours per iteration. The iPCA result was obtained by 30 iterations.

TABLE 3

Running time of matrix factorization methods in the EachMovie experiment

| Method | Run Time | Iterations | Method | Run Time | Iterations |
|---|---|---|---|---|---|
| SVD (d = 20) | 6120 sec. | 500 | pPCA (d = 20) | 545 sec. | 30 |
| SVD (d = 40) | 8892 sec. | 500 | pPCA (d = 40) | 1534 sec. | 30 |
| iSVD | 255 sec. | 5 | iPCA | 2046 sec. | 30 |

The infinite-dimensional matrix factorization models can solve large-scale collaborative filtering problems. Two examples of these models are singular value decomposition (SVD) and probabilistic principal component analysis (pPCA). Tests show that infinite-dimensional models are in fact efficient on very large-scale data containing 100 million ratings. Moreover, though probabilistic approaches are usually believed not as scalable as non-probabilistic methods, the iPCA is as fast as it non-probabilistic counterpart. In terms of the predictive accuracy, infinite-dimensional models often outperformed the low-rank methods, and probabilistic models delivered more accurate results than non-probabilistic models.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A computer-implemented method for generating a recommendation, comprising:
  a. performing collaborative filtering on a matrix Y containing historical data of users' ratings on a set of products using an infinite dimensional matrix factorization with a probabilistic non-parametric model where parameters are in infinite-dimensional parameter spaces, wherein the infinite dimensional matrix factorization comprises $$\min_{X, K > 0} (Y - X)_O^2 + \gamma_1 tr(XK^{-1}X^T) + \gamma_2 tr(K),$$

where K is a square matrix represeting a covarience of X, X is a recommendation matrix, wherein T represents a determinant, Y is the matrix containing missing values, tr is a transpose operation, O denotes indices of observed elements of Y and where $\gamma_1$ and $\gamma_2$ are constants>0;
- b. generating one or more recommendations using the collaborative filtering from the recommendation matrix X; and
- c. displaying the recommendations to a user.

2. The method of claim 1, comprising performing probabilistic matrix factorization on data.

3. The method of claim 1, comprising performing non-probabilistic matrix factorization on the data.

4. The method of claim 1, comprising performing matrix factorization with iSVD (infinite-dimensional Singular Value Decomposition).

5. The method of claim 1, comprising performing matrix factorization with pPCA (infinite-dimensional probabilistic Principal Component Analysis).

6. The method of claim 1, comprising collecting user preferences on one or more items.

7. The method of claim 1, comprising collecting a mean and a covariance on user preferences on one or more items.

8. The method of claim 1, comprising determining a global item-to-item relationship or similarity for all the users.

9. The method of claim 1, comprising determining an item to item relationship or similarity associated with each user.

10. The method of claim 9, comprising applying the item to item relationship or similarity to infer user preferences.

11. The method of claim 10, wherein local statistics are used to infer a mean and a covariance on user preferences on one or more items.

12. The method of claim 10, wherein local statistics comprises covariance of user preference and data noise error.

13. The method of claim 12, wherein the user preference and data noise error are processed in combination to reduce processing time.

14. The method of claim 1, comprising generating global statistics including an item to item relationship or similarity associated with each user.

15. The method of claim 1, comprising processing a canonical expectation-maximization (EM) operation.

16. The method of claim 1, comprising determining $$K \leftarrow K + \frac{1}{M}KBK,$$

where M is a number of users and B is matrix storing intermediate results.

17. A system to generate a recommendation for a user, comprising:
- a. a processor executing a collaborative filter on a matrix Y containing historical data of users' ratings on a set of products using an infinite dimensional matrix factorization with a probabilistic non-parametric model, where parameters are in infinite-dimensional parameter spaces, wherein the infinite dimensional matrix factorization comprises $$\min_{X, K>0} (Y - X)_O^2 + \gamma_1 tr(XK^{-1}X^T) + \gamma_2 tr(K),$$

where K is a square matrix represeting a covarience of X, X is a recommendation matrix, wherein T represents a determinant, Y is the matrix containing missing values, tr is a transpose operation, O denotes indices of observed elements of Y and where $\gamma_1$ and $\gamma_2$ are constants>0;
- b. a recommender engine executed by the processor to generate one or more recommendations using the collaborative filter from the recommendation matrix X; and
- c. a user interface engine executed by the processor to render the recommendations to a user.

18. The system of claim 17, wherein the matrix factorization comprises iSVD (infinite-dimensional Singular Value Decomposition).

19. The system of claim 17, wherein the matrix factorization comprises pPCA (infinite-dimensional probabilistic Principal Component Analysis).

20. The system of claim 17, wherein the matrix factorization operates on a mean and a covariance on user preferences on one or more items.

* * * * *